(12) United States Patent
Jennings et al.

(10) Patent No.: US 10,954,130 B1
(45) Date of Patent: Mar. 23, 2021

(54) DEMULSIFICATION COMPOUND FOR OIL SEPARATION FROM WASTE STREAMS

(71) Applicant: Applied Material Solutions, Inc., Elkhorn, WI (US)

(72) Inventors: Michael T. Jennings, Marietta, GA (US); Robert Wilson, Marietta, GA (US)

(73) Assignee: Applied Material Solutions, Inc., Elkhorn, WI (US)

(*) Notice: Subject to any disclaimer, the term of this patent is extended or adjusted under 35 U.S.C. 154(b) by 0 days.

(21) Appl. No.: 16/867,365

(22) Filed: May 5, 2020

Related U.S. Application Data

(62) Division of application No. 15/977,918, filed on May 11, 2018.

(51) Int. Cl.
| | |
|---|---|
| *C01B 33/12* | (2006.01) |
| *C01B 33/20* | (2006.01) |
| *C11B 13/00* | (2006.01) |
| *C02F 103/36* | (2006.01) |
| *C02F 1/68* | (2006.01) |

(52) U.S. Cl.
CPC ............ *C01B 33/128* (2013.01); *C01B 33/20* (2013.01); *C11B 13/00* (2013.01); *C01P 2004/50* (2013.01); *C01P 2004/61* (2013.01); *C01P 2006/12* (2013.01); *C01P 2006/90* (2013.01); *C02F 1/681* (2013.01); *C02F 2103/36* (2013.01); *C02F 2305/04* (2013.01)

(58) Field of Classification Search
CPC ....... C01B 33/128; C01B 33/20; C01B 33/12; C01B 33/126; C01B 33/18–193; C01B 33/22; C01B 33/26; C01B 33/32; C11B 13/00; C02F 1/681; C02F 2103/36; C02F 2305/04; C01P 2004/61; C01P 2006/90; C01P 2006/12; C01P 2004/50
See application file for complete search history.

(56) References Cited

U.S. PATENT DOCUMENTS

| | | | | |
|---|---|---|---|---|
| 4,443,357 A | * | 4/1984 | Maloney | D21D 5/26 |
| | | | | 516/117 |
| 2005/0228106 A1 | * | 10/2005 | Schaefer | B82Y 30/00 |
| | | | | 524/492 |

* cited by examiner

*Primary Examiner* — Anthony J Zimmer
(74) *Attorney, Agent, or Firm* — Jansson Munger McKinley & Kirby Ltd.

(57) ABSTRACT

A method for producing an additive for reclaiming oil from a fluid product stream and a treated silica with controlled hydrophobicity are disclosed. The method includes the steps of providing silica or silicate with a particle size of between 3.0 μm to 20 μm, the silica or silicates having an agglomerate size of between 10 μm to 100 μm and being chosen to achieve the desired particle-size range and with a controlled level of hydrophobicity; treating the silica or silicate with a silicone or silane to make it hydrophobic; and controlling the hydrophobicity of the silica or silicate by varying the temperature and treatment time of the silica or silicate, amount of a treating material used to treat the silica or silicate, and the molecular weight of the treating material. The additive improves oil extraction and concentration from a fluid product stream.

3 Claims, 13 Drawing Sheets

Chart 4 d10 = 2.7μm, d50 = 6.30μm, d90 = 39.02μm, Mean Agglomerate Size = 13.25μm Mean Particle Size = 9μm Photo 1          Photo 2

FIG. 4

Testing of Thin Stillage from Ethanol Plant 1

| Sample # | Silica 1 | Silica 2 | Silica 3 | %Silicone | Silicone Vis | Mill 1: Corn Oil and Silica | Mill 1: Ethoxylate Fatty Triglyceride and Silica | Mill 1: Ethoxylated Saccharide Ester and Silica |
|---|---|---|---|---|---|---|---|---|
| 1 | 1 | 1 | 1 | 6 | 1000 | 2.25 | 6.00 | 1.00 |
| 2 | 1 | 1 | 2 | 12 | 550 | 0.75 | 5.25 | 2.00 |
| 3 | 1 | 0 | 0 | 6 | 1000 | 1.00 | 4.75 | 2.75 |
| 4 | 1 | 0 | 1 | 18 | 1000 | 1.25 | 5.25 | 3.00 |
| 5 | 1 | 1 | 1 | 12 | 100 | 1.00 | 5.00 | 3.75 |
| 6 | 1 | 0 | 0 | 18 | 1000 | 1.50 | 4.75 | 3.00 |
| 7 | 1 | 1 | 1 | 12 | 1000 | 1.25 | 3.75 | 4.00 |
| 8 | 0 | 0 | 1 | 6 | 100 | 0.50 | 3.25 | 1.00 |
| 9 | 0 | 1 | 1 | 18 | 1000 | 3.50 | 3.75 | 2.50 |
| 10 | 1 | 1 | 0 | 12 | 550 | 2.25 | 5.00 | 1.50 |
| 11 | 1 | 1 | 1 | 12 | 550 | 1.75 | 4.00 | 2.00 |
| 12 | 0 | 1 | 0 | 18 | 100 | 0.50 | 3.75 | 1.50 |
| 13 | 0 | 1 | 0 | 6 | 1000 | 0.75 | 2.75 | 1.00 |
| 14 | 1 | 1 | 1 | 12 | 550 | 0.25 | 3.90 | 2.00 |
| 15 | 1 | 1 | 1 | 18 | 100 | 0.25 | 3.25 | 0.75 |
| 16 | 0 | 0 | 1 | 6 | 1000 | 0.10 | 3.00 | 1.25 |
| 17 | 1 | 1 | 0 | 18 | 1000 | 0.50 | 5.00 | 2.25 |
| 18 | 1 | 0 | 1 | 6 | 100 | 0.10 | 4.75 | 1.75 |
| 19 | 1 | 1 | 1 | 18 | 550 | 0.10 | 6.00 | 2.75 |
| 20 | 1 | 2 | 1 | 12 | 550 | 3.75 | 7.00 | 2.50 |
| 21 | 2 | 1 | 1 | 12 | 550 | 1.50 | 6.50 | 3.75 |
| 22 | 1 | 1 | 1 | 6 | 550 | 2.75 | 6.00 | 2.00 |
| 23 | 1 | 1 | 0 | 6 | 100 | 3.00 | 6.50 | 3.00 |
| 24 | 1 | 0 | 1 | 12 | 550 | 3.50 | 6.25 | 1.00 |
| 25 | 0 | 0 | 1 | 18 | 100 | 2.25 | 5.75 | 1.75 |
| 26 | 1 | 0 | 0 | 18 | 100 | 1.25 | 5.75 | 2.00 |
| 27 | 0 | 1 | 1 | 12 | 550 | 2.25 | 5.50 | 2.50 |
| 28 | 0 | 1 | 1 | 6 | 100 | 0.10 | 5.75 | 4.00 |
| 29 | 1 | 0 | 0 | 0 | 0 | 5.50 | 5.50 | 5.00 |
| 30 | 0 | 1 | 0 | 0 | 0 | 0.20 | 5.00 | 5.00 |
| 31 | 0 | 0 | 1 | 0 | 0 | 0.25 | 6.00 | 5.00 |

*Table 1 – Results for Ethanol Plant 1*

FIG. 5

Testing of Thin Stillage from Ethanol Plant 2

| Sample # | Silica 1 | Silica 2 | Silica 3 | %Silicone | Silicone Vis | Mill 2: Corn Oil and Silica | Mill 2: Ethoxylated Saccharide Ester and Silica | Mill 2: Ethoxylated Triglyceride and Silica |
|---|---|---|---|---|---|---|---|---|
| 1 | 1 | 1 | 1 | 6 | 1000 | 2.25 | 6.00 | 1.00 |
| 2 | 1 | 1 | 2 | 12 | 550 | 0.75 | 5.25 | 2.00 |
| 3 | 1 | 0 | 0 | 6 | 1000 | 1.00 | 4.75 | 2.75 |
| 4 | 1 | 0 | 1 | 18 | 1000 | 1.25 | 5.25 | 3.00 |
| 5 | 1 | 1 | 1 | 12 | 100 | 1.00 | 5.00 | 3.75 |
| 6 | 1 | 0 | 0 | 18 | 1000 | 1.50 | 4.75 | 3.00 |
| 7 | 1 | 1 | 1 | 12 | 1000 | 1.25 | 3.75 | 4.00 |
| 8 | 0 | 0 | 1 | 6 | 100 | 0.50 | 3.25 | 1.00 |
| 9 | 0 | 1 | 1 | 18 | 1000 | 3.50 | 3.75 | 2.50 |
| 10 | 1 | 1 | 0 | 12 | 550 | 2.25 | 5.00 | 1.50 |
| 11 | 1 | 1 | 1 | 12 | 550 | 1.75 | 4.00 | 2.00 |
| 12 | 0 | 1 | 0 | 18 | 100 | 0.50 | 3.75 | 1.50 |
| 13 | 0 | 1 | 0 | 6 | 1000 | 0.75 | 2.75 | 1.00 |
| 14 | 1 | 1 | 1 | 12 | 550 | 0.25 | 3.90 | 2.00 |
| 15 | 1 | 1 | 1 | 18 | 100 | 0.25 | 3.25 | 0.75 |
| 16 | 0 | 0 | 1 | 6 | 1000 | 0.10 | 3.00 | 1.25 |
| 17 | 1 | 1 | 0 | 18 | 1000 | 0.50 | 5.00 | 2.25 |
| 18 | 1 | 0 | 1 | 6 | 100 | 0.10 | 4.75 | 1.75 |
| 19 | 1 | 1 | 1 | 18 | 550 | 0.10 | 6.00 | 2.75 |
| 20 | 1 | 2 | 1 | 12 | 550 | 3.75 | 7.00 | 2.50 |
| 21 | 2 | 1 | 1 | 12 | 550 | 1.50 | 6.50 | 3.75 |
| 22 | 1 | 1 | 1 | 6 | 550 | 2.75 | 6.00 | 2.00 |
| 23 | 1 | 1 | 0 | 6 | 100 | 3.00 | 6.50 | 3.00 |
| 24 | 1 | 0 | 1 | 12 | 550 | 3.50 | 6.25 | 1.00 |
| 25 | 0 | 0 | 1 | 18 | 100 | 2.25 | 5.75 | 1.75 |
| 26 | 1 | 0 | 0 | 18 | 100 | 1.25 | 5.75 | 2.00 |
| 27 | 0 | 1 | 1 | 12 | 550 | 2.25 | 5.50 | 2.50 |
| 28 | 0 | 1 | 1 | 6 | 100 | 0.10 | 5.75 | 4.00 |
| 29 | 1 | 0 | 0 | 0 | 0 | 5.50 | 5.50 | 5.00 |
| 30 | 0 | 1 | 0 | 0 | 0 | 0.20 | 5.00 | 5.00 |
| 31 | 0 | 0 | 1 | 0 | 0 | 0.25 | 6.00 | 5.00 |

*Table 2 – Results for Ethanol Plant 2*

FIG. 6

Testing of Thin Stillage from Ethanol Plant 3

| Sample # | Silica 1 | Silica 2 | Silica 3 | %Silicone | Silicone Vis | Mill 3: Corn oil and Silica | Mill 3: Ethoxylated Triglyceride and Silica | Mill 3: Ethoxylated Saccharide Ester and Silica |
|---|---|---|---|---|---|---|---|---|
| 1 | 1 | 1 | 1 | 6 | 1000 | 2.00 | 5.25 | 1.50 |
| 2 | 1 | 1 | 2 | 12 | 550 | 3.25 | 4.90 | 1.90 |
| 3 | 1 | 0 | 0 | 6 | 1000 | 2.25 | 4.75 | 0.50 |
| 4 | 1 | 0 | 1 | 18 | 1000 | 2.75 | 4.00 | 2.25 |
| 5 | 1 | 1 | 1 | 12 | 100 | 2.75 | 3.75 | 2.00 |
| 6 | 1 | 0 | 0 | 18 | 1000 | 2.50 | 3.00 | 2.75 |
| 7 | 1 | 1 | 1 | 12 | 1000 | 1.90 | 3.00 | 3.00 |
| 8 | 0 | 0 | 1 | 6 | 100 | 2.25 | 1.90 | 4.00 |
| 9 | 0 | 1 | 1 | 18 | 1000 | 3.00 | 2.50 | 1.75 |
| 10 | 1 | 1 | 0 | 12 | 550 | 1.50 | 2.00 | 4.00 |
| 11 | 1 | 1 | 1 | 12 | 550 | 2.50 | 2.10 | 0.10 |
| 12 | 0 | 1 | 0 | 18 | 100 | 1.75 | 1.50 | 0.10 |
| 13 | 0 | 1 | 0 | 6 | 1000 | 1.25 | 1.25 | 3.50 |
| 14 | 1 | 1 | 1 | 12 | 550 | 2.75 | 1.75 | 4.25 |
| 15 | 1 | 1 | 1 | 18 | 100 | 3.25 | 2.00 | 4.75 |
| 16 | 0 | 0 | 1 | 6 | 1000 | 2.90 | 1.75 | 3.50 |
| 17 | 1 | 1 | 0 | 18 | 1000 | 3.00 | 1.50 | 0.00 |
| 18 | 1 | 0 | 1 | 6 | 100 | 2.00 | 4.25 | 0.10 |
| 19 | 1 | 1 | 1 | 18 | 550 | 0.75 | 3.00 | 0.50 |
| 20 | 1 | 2 | 1 | 12 | 550 | 1.75 | 5.50 | 0.75 |
| 21 | 2 | 1 | 1 | 12 | 550 | 1.90 | 6.75 | 3.10 |
| 22 | 1 | 1 | 1 | 6 | 550 | 1.90 | 5.50 | 3.00 |
| 23 | 1 | 1 | 0 | 6 | 100 | 1.50 | 6.00 | 3.25 |
| 24 | 1 | 0 | 1 | 12 | 550 | 2.00 | 7.00 | 1.75 |
| 25 | 0 | 0 | 1 | 18 | 100 | 2.25 | 6.50 | 0.00 |
| 26 | 1 | 0 | 0 | 18 | 100 | 1.90 | 6.25 | 1.50 |
| 27 | 0 | 1 | 1 | 12 | 550 | 1.75 | 7.00 | 0.00 |
| 28 | 0 | 1 | 1 | 6 | 100 | 1.75 | 2.50 | 0.00 |
| 29 | 1 | 0 | 0 | 0 | 0 | 0.10 | 3.50 | 0.00 |
| 30 | 0 | 1 | 0 | 0 | 0 | 0.50 | 3.00 | 0.75 |
| 31 | 0 | 0 | 1 | 0 | 0 | 1.00 | 1.75 | 0.10 |

*Table 3 – Results for Ethanol Plant 3*

Chart 3

DEMULSIFICATION COMPOUND FOR OIL SEPARATION FROM WASTE STREAMS

FIELD OF THE INVENTION

The field is related generally to chemical compounds, and more particularly to a chemical compound for enhanced demulsification for oil separation in product waste streams.

BACKGROUND OF THE INVENTION

Many industrial processes result in a waste stream liquor which contains some amount of a desired material. Examples of this would be corn oil in the manufacture of ethanol, tall oil in the manufacture of pulp and paper, and other industries requiring organic separation from the process, such as petroleum. Oftentimes this chemistry involves the use of surfactants to break the emulsion and release the desired oil from the liquor.

At times silicates such as precipitated or fumed silicon dioxide, diatomaceous earth, talc, or volcanic ash among others, are added to the surfactant to further enhance the separation of the desired oil from the liquor. The surface of the silicate may be treated with a hydrophobic compound such as silicone, polyethylene, beeswax or stearic acid for example, but not limited to these examples as there are other viable options. The treatment makes the silicate hydrophobic which can further enhance the performance of the demulsifying compound. The prior art in this field notes that either hydrophobic silicate, hydrophilic silicate, or a mixture thereof is preferable in corn oil demulsification.

The use of chemicals to separate organic components from aqueous waste streams has a long and varied history with the challenge of corn oil demulsification being the most recent to emerge. Initially all non-aqueous liquids were reintroduced into the solid materials collected as the fat content for animal feed (dried distillers grain with solubles, or DDGS). However it was determined that the corn oil could be successfully used as a raw material for the production of bio-diesel fuel. This renewable source of diesel fuel was a boom to the ethanol fermentation sector and ignited a determined effort to reclaim this material from the waste stream. The initial method used was in the use of centrifuges or mechanical methods to separate the individual components in the liquor. The results, which were successful, however were also inconsistent in the yield of this material. In the early to mid-2000's chemicals were investigated as additives to assist with the separation. Various surfactants were introduced with the most successful being the ethoxylated sorbitan esters. The use of a formulated product (multi-component) was introduced later in the development scheme. Silica and its treated counterpart, hydrophobic silica, were some of the latest components added. Other chemicals have been successfully used in this effort as well.

Initially mechanical methods for removing oil were invented, such as decanting, boiling, centrifuging, or combinations. As effective as these methods have been, oil concentrations within the water phase still remain. As noted above, chemical additives were invented as a result to supplement and enhance the mechanical methodologies, which can be seen in the prior art. Some examples of such prior art are: U.S. Pat. Nos. 4,029,596; 6,201,142; 8,192,627; 8,841,469 and 8,962,059.

Prior art in this field relies on chemically weakening the micelle strength encapsulating the oil within the water, with or without a physical rupturing of the micelle by a solid particle dispersed within. Thus the oil is released from suspension and able to be more readily extracted by the traditional mechanical methods noted above.

Applicant's inventive silicate addresses and solves the problems in the industry related to oil separation in waste streams. Wide varieties of chemical additives for oil separation have been created and are available. However, there is a need for an improved additive for both effectiveness and efficiency, and it is to this need that this invention is directed.

SUMMARY OF THE INVENTION

The present invention addresses the problem of providing an effective and energy efficient additive for reclaiming oil from fluids.

Highly preferred embodiments include a method for producing an additive for reclaiming oil from a fluid product stream including the steps of: (1) providing at least one silica or silicate with a particle size of between 3.0 µm to 20 µm, the particle size being chosen to achieve the desired particle-size range and with a controlled level of hydrophobicity measured by a methanol wet out testing procedure, the at least one or more silica or silicates having an agglomerate size of between 10 µm to 100 µm and being chosen to achieve the desired particle-size range and with a controlled level of hydrophobicity measured by the methanol wet out testing, (2) treating the silica or silicate with a silicone or silane to make the silica or silicate hydrophobic, and (3) controlling the hydrophobicity of the silica or silicate by varying the temperature of the silica or silicate, treatment time of the silica or silicate, amount of a treating material used to treat the silica or silicate, and the molecular weight of the treating material. The additive improves oil extraction and concentration from the fluid product stream.

In preferred embodiments the silicone and silane are either methyl terminated or hydroxyl terminated and have a viscosity of between 50 centistokes to 10,000 centistokes. Preferably stearic acid, Fisher-Tropsch waxes, paraffin waxes, hexamethyldisilizane ("HMDZ"), MQ resins, or a combination of any of the above materials are used to make the silica or silicate hydrophobic.

Highly-preferred embodiments include the application of: (a) silicone with a viscosity ranging from 50 cs to 10,000 cs; (b) stearic acid; (c) Fisher Tropsch wax; (d) paraffin wax; (e) HMDZ; (f) MQ resins; and (g) hydroxy terminated silicones to make the silica or silicate hydrophobic with silica or silicate treatment levels ranging from 5 to 20 weight percent to obtain the hydrophobicity, and the silica or silicate being treated as a blend, or alternatively, each of the silica or silicate being treated separately and then blended.

Preferably the silica or silicate enhances recovery of desired oil from an emulsion resulting from an industrial process, the oil being either an internal phase or an external phase of an emulsion process. Preferred embodiments also include the step of blending the silica or silicate with an oil or surfactant to increase oil recovery from the fluid product stream.

In preferred embodiments, the silica or silicate is added at levels of 2 to 15 weight percent in which a surfactant or a surfactant and oil blend is used as a primary demulsifier and the silica or silicate enhances the performance of the resulting blend. Preferred embodiments also include the step of adding one of the following (a) one or more oils to modify the viscosity of the resulting blend or as a diluent for the resulting blend, (b) one or more oils used in conjunction with a surfactant and the silica or silicate to further enhance the performance of the resulting blend or as a diluent, or (c)

one or more oils to modify the viscosity or as a diluent and used in conjunction with the silica and silicate at levels ranging from 5 to 50 weight percent of the resulting blend.

The one or more oils preferably include fatty acids such as oleic acid, tall oil; fatty acid esters of oleic acid, tall oil; triglycerides esters derived from castor oil, corn oil, soy bean oil, canola oil, palm kernel oil, coconut oil, peanut oil, rape seed oil, mustard seed oil, sperm oil, rice bran oil, fish oil, sperm oil, beef tallow or a blend thereof; or mineral oils in some preferred embodiments.

Preferred embodiments, also include a demulsifying step which is enhanced by the use of treated silica or silicate with a controlled hydrophobicity in conjunction with surfactants and non-surface-active chemicals.

Preferably the surfactants and non-surface-active chemicals include alkoxylated plant fats and oils consisting of ethoxylated castor oil, ethoxylated soy bean oil, ethoxylated palm kernel oil, ethoxylated almond oil, ethoxylated corn oil, ethoxylated canola oil, ethoxylated coconut oil, ethoxylated peanut oil, ethoxylated rapeseed oil, ethoxylated mustard seed oil, ethoxylated rice bran oil, or a blend thereof; as well as ethoxylated, propoxylated, or ethoxylate propoxylated copolymers, fatty acid esters of oleic acid, tall oil, fatty acids derived from castor oil, corn oil, soy bean oil, canola oil, palm kernel oil, coconut oil, peanut oil, rape seed oil, mustard seed oil, rice bran oil, or a blend thereof; ethoxylated, propoxylated, or ethoxylated propoxylate copolymers ethers of C8 to C20 fatty alcohols, linear, branched, primary, secondary, or tertiary or a blend thereof; alkoxylated animal oils consisting of ethoxylated fish oil, sperm oil, and beef tallow; and ethoxylated, propoxylated, or ethoxylate propoxylated copolymers, fatty acid esters derived from fish oil, beef tallow, sperm oil, or a blend thereof. In some preferred embodiments, the surfactants are ethoxylated sorbitan esters, ethoxylated saccharide fatty esters, ethoxylated fatty glycerides, and non-ionic additives. In other preferred embodiments, the surfactants are alkoxylated plant oils, fats and fatty acids, alkoxylated animal oils, fats, and fatty acids, alkyl polyglucosides, alkoxylated glycerols and combinations thereof. In certain preferred embodiments, the oil is recovered from an ethanol fermentation process using corn.

Other highly preferred embodiments include a treated silica with controlled hydrophobicity comprising a silica or silicate with a particle size of between 3.0 µm to 20 µm, the silica or silicate having a Specific Surface Area of 100 m$^2$/g to 200 m$^2$/g, and the silica or silicate having an average agglomerate size of between 10 µm to 100 µm.

Preferably, the temperature of the silica or silicate is controlled, the amount of treating material for the silica or silicate is controlled, the temperature of treatment for the silica or silicate is controlled, and the duration time of treatment for the silica or silicate is controlled.

As noted above, a silicate and method of treatment of the silicate is disclosed which enhances the extraction of emulsified oil from an oil and water emulsion. The silicate can work independent of a surfactant or in conjunction with a surfactant to enhance oil recovery from the oil and water emulsion. The performance of the silicate is dependent upon the silicate particle size, agglomerate size, particle size distribution, particle shape, surface area, the degree of surface treating, and the treatment compound used to make the particles more hydrophobic. The treated silicate can be used with a surfactant or a hydrophobic oil such as vegetable oil to cause the needed separation.

In testing and as noted below, when the hydrophobicity is controlled on the treated silicate it performed more consistently across various liquor sources than just hydrophobic, hydrophilic, or a mixture of the two. The controlled treated silicate differs from a mixture of hydrophobic and hydrophilic silicates in that when placed in water the controlled treated silicate will remain completely hydrophobic and a mixture of hydrophilic and hydrophobic silicates will wet out when placed in water, but the controlled treated silicate will begin to wet out when placed in a methanol and water solution sooner than a typical hydrophobic silicate. The invention is not as hydrophobic as in typical commercially available grades of hydrophobic silica.

Particle size and particle size distribution played a major role in the product's performance. The silicates were tested in surface active materials or surfactants and in vegetable oil (non-surface active material) and it was determined that the silicate performance was evident and measurable in either case.

Preferably, typical surfactants used for these processes are ethoxylated esters or anionic surfactants. The esters can be, but are not limited to, saccharide fatty esters, castor oil esters, alkoxylated fatty esters, or ionic compounds such as sulfated or sulfonated compounds. Some of these esters or compounds are then treated with ethylene oxide to make them more hydrophilic.

At the proper hydrophilic-lipophilic balance ("HLB") and with the proper chemistry the surfactant begins to destabilize the emulsion containing the desired oil in the liquor and that oil is then released from the liquor and recovered. The use of a silicate enhances the oil separation, and with the proper hydrophobicity, particle size, and particle size distribution of the silicate the oil recovery can be optimized.

It will be apparent to those skilled in the art that some silicates perform better in demulsifying applications than other silicates. The performance difference between silicates is dependent on a combination of several factors such as the silicate particle size, agglomerate size, particle size distribution, particle shape, surface area, the degree of surface treating, and the treatment compound used to treat the silicate. Preferably, the silicon containing particles are precipitated hydrophobic silica particles.

It should be noted that it is not sufficient to simply disclose a hydrophilic silica, hydrophobic silica, or a mixture of the two as there are many pertinent variables to be considered. Particle size, specific surface area, treatment substrate, and the percent of the treatment substrate on the silicate all play an integral role in the efficiency of the oil separation achieved using these compounds. Treatment substrates on the silicates can preferably include, but are not limited to, silicones of various viscosities ranging from 10 cs to 10,000 cs; for example, hydroxyl silicones, hexamethyldisilizane, dichlorodimethylsilane, MQ resins, paraffin wax, Fisher-Tropsch waxes, and stearic acid. Treatment of a silicate with any of these substrates results in a hydrophobic silicate to varying degrees.

Testing has shown that no one silica, silica treatment, or treatment level is sufficient to claim one particle type or treatment level works best or in all situations of demulsifying oil separation. Test results, Tables 1 through 3, illustrate hydrophilic to very hydrophobic silicates with a wide range of particle sizes, and particle size distribution along with various treatment levels can yield the most oil depending upon the surfactant used in conjunction with the silicate and the different substrates of syrup where oil is being extracted.

It is proposed that a silicate of limited hydrophobicity and a broad particle and agglomerate size range would be best suited to perform over the widest range of demulsifying/oil separation applications. Silicates are numbered 1 through 31 as shown below.

Methods of manufacture and use are within the scope of the invention.

Definitions

"A" or "an" means one or more.

"About" means approximately or nearly, and in the context of a numerical value or range set forth herein, means 10% of the numerical value or range recited or claimed.

"Decant" means or refers to gently pouring a liquid so as not to disturb the sediment.

"Demulsifier" means or refers to a product designed to break an oil in water emulsion and to release the oil.

"Emulsion" means or refers to when droplets of one liquid are dispersed and suspended within another immiscible liquid.

"EO" means or refers to ethylene oxide or ethoxylated compound.

"Hydrophobic silica" means or refers to silicon dioxide treated with hydrophobic compounds such as a wax, or more typically, silicone.

"Liquor" means or refers to a liquid substance such as a water-based solution from operations.

"Molecular weight" means or refers to the weight average molecular weight of a polymer.

"PDMS" means or refers to polydimethylsiloxane or silicone.

"Precipitated hydrophilic silicas" means or refers to commercially available silicas.

"Silica" means or refers to silicon dioxide.

"Silicate" means or refers to precipitated silica, fumed silica, diatomaceous earth, volcanic ash, talc, and other such compounds which are silicates and are referred to as such throughout the patent.

"Thin stillage" or "stillage" means or refers to the liquid stream remaining after the ethanol has been distilled and insoluble particles are removed from the whole stillage, whether or not that stillage has already been concentrated to higher level of solids.

As used herein, the term "wt. %" means or refers to percent by weight.

BRIEF DESCRIPTION OF THE DRAWINGS

The drawings illustrate a preferred embodiment including the above-noted characteristics and features of the invention. The invention will be readily understood from the descriptions and drawings. In the drawings:

FIG. 4 is Table 1 illustrating the test results from Ethanol Plant 1;

FIG. 5 is Table 2 illustrating the test results from Ethanol Plant 2;

FIG. 6 is Table 3 illustrating the test results from Ethanol Plant 3;

DETAILED DESCRIPTION OF THE INVENTION

Figure 1:
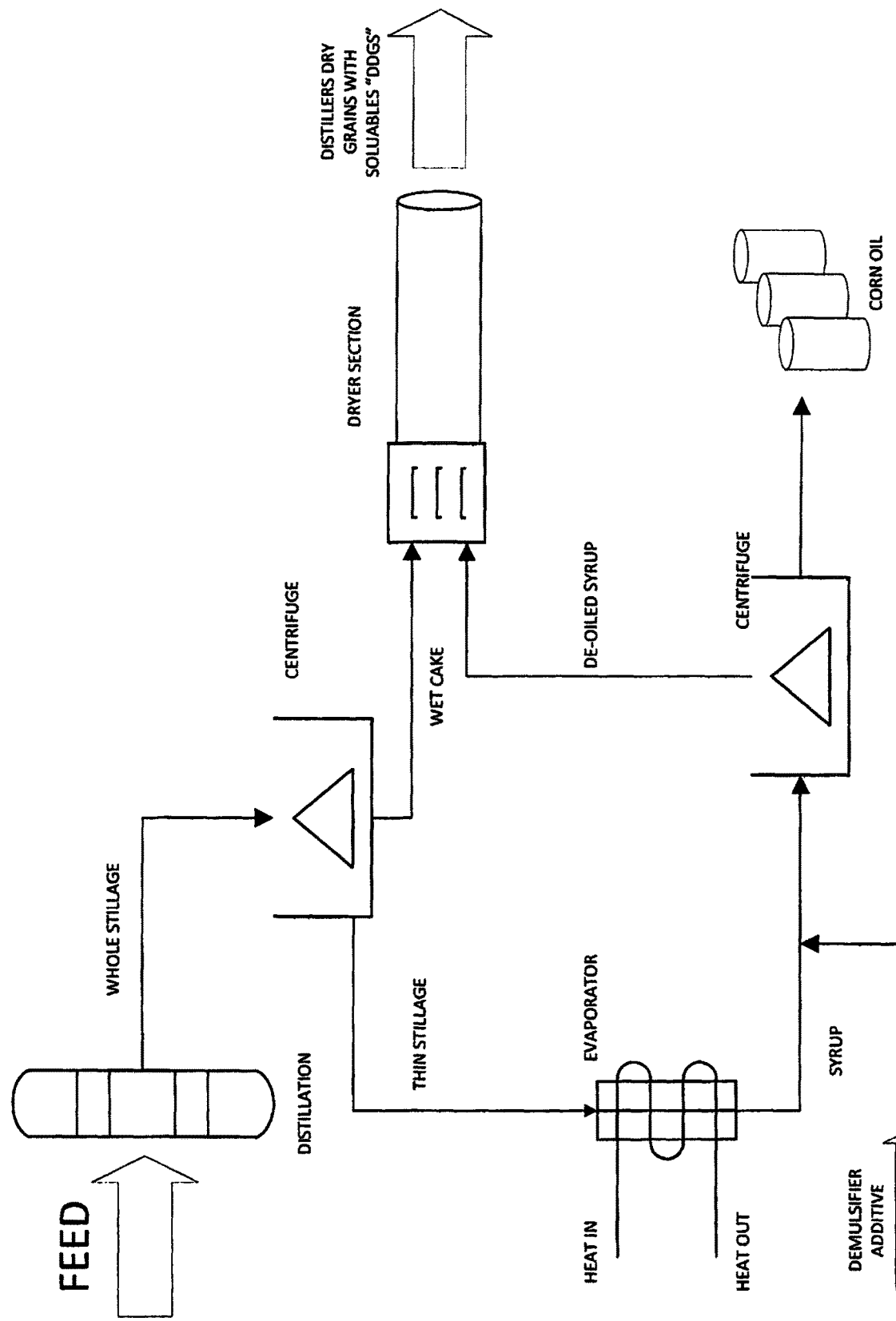
FIG. 1 is a simplified flow diagram of an oil/water separation process in which a demulsifying chemical additive is introduced without a retention vessel.
Figure 2:
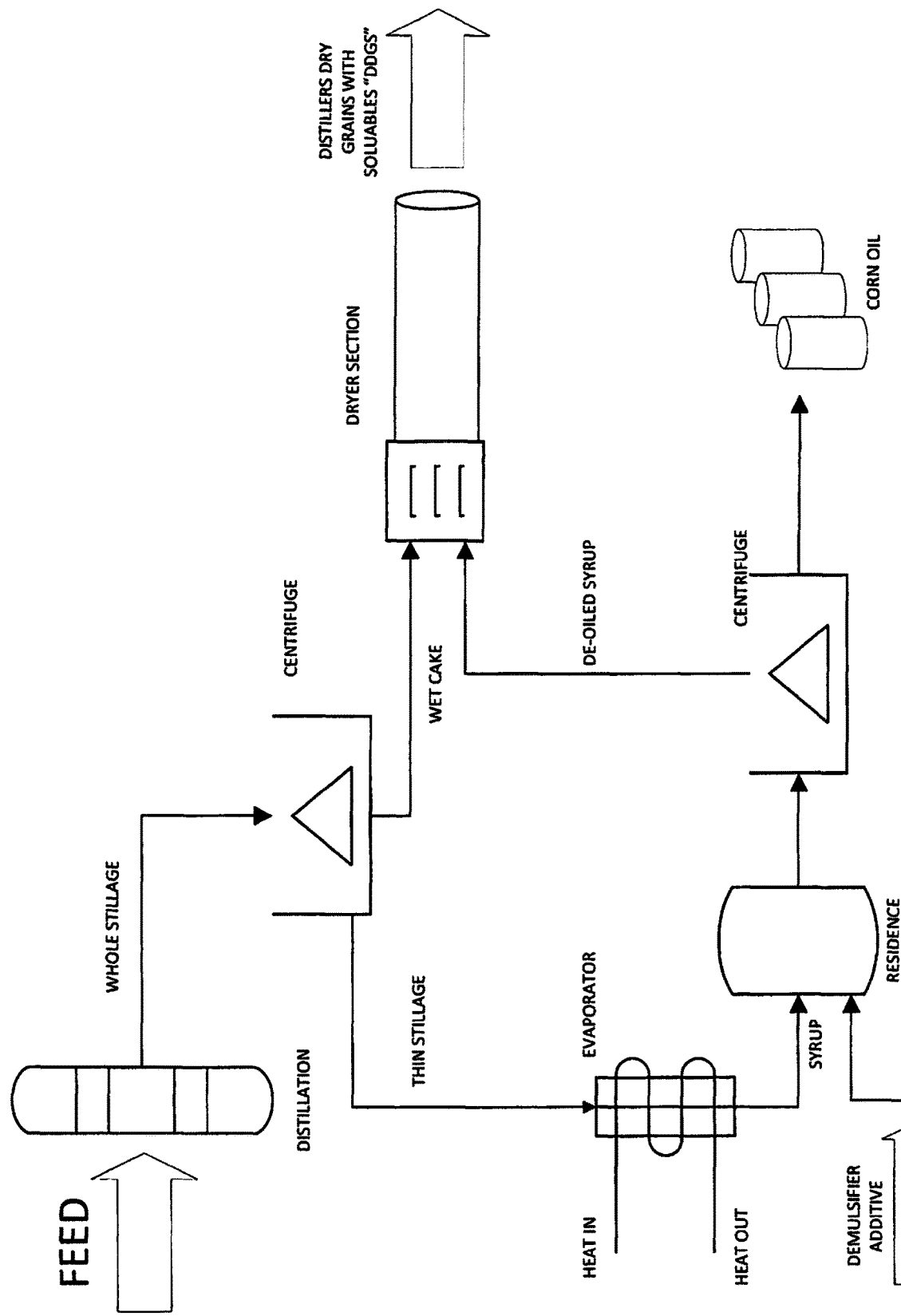
FIG. 2 is a simplified flow diagram of an oil/water separation process in which a demulsifying chemical additive is introduced with a retention vessel.
Figure 3:
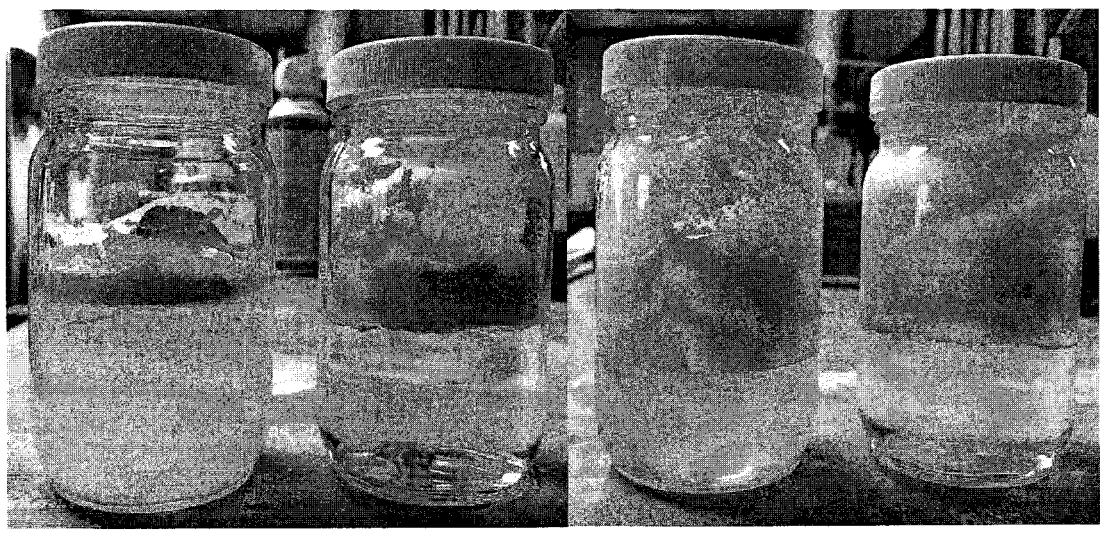
FIG. 3 illustrates two comparative photographs of silica blends.
Figure 7:
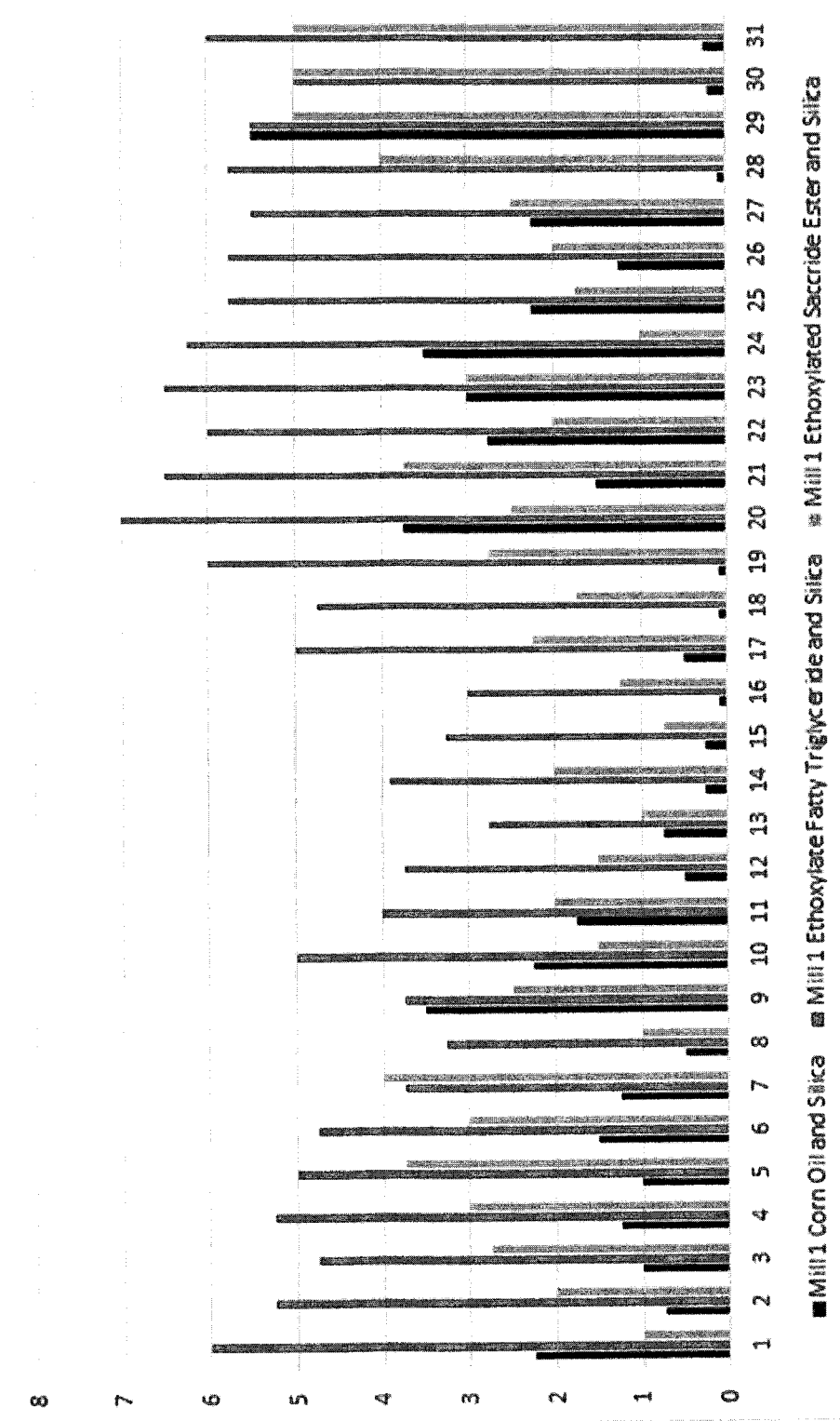
FIGS. 7-9 are charts illustrating Mill Test Data.
Figure 8:
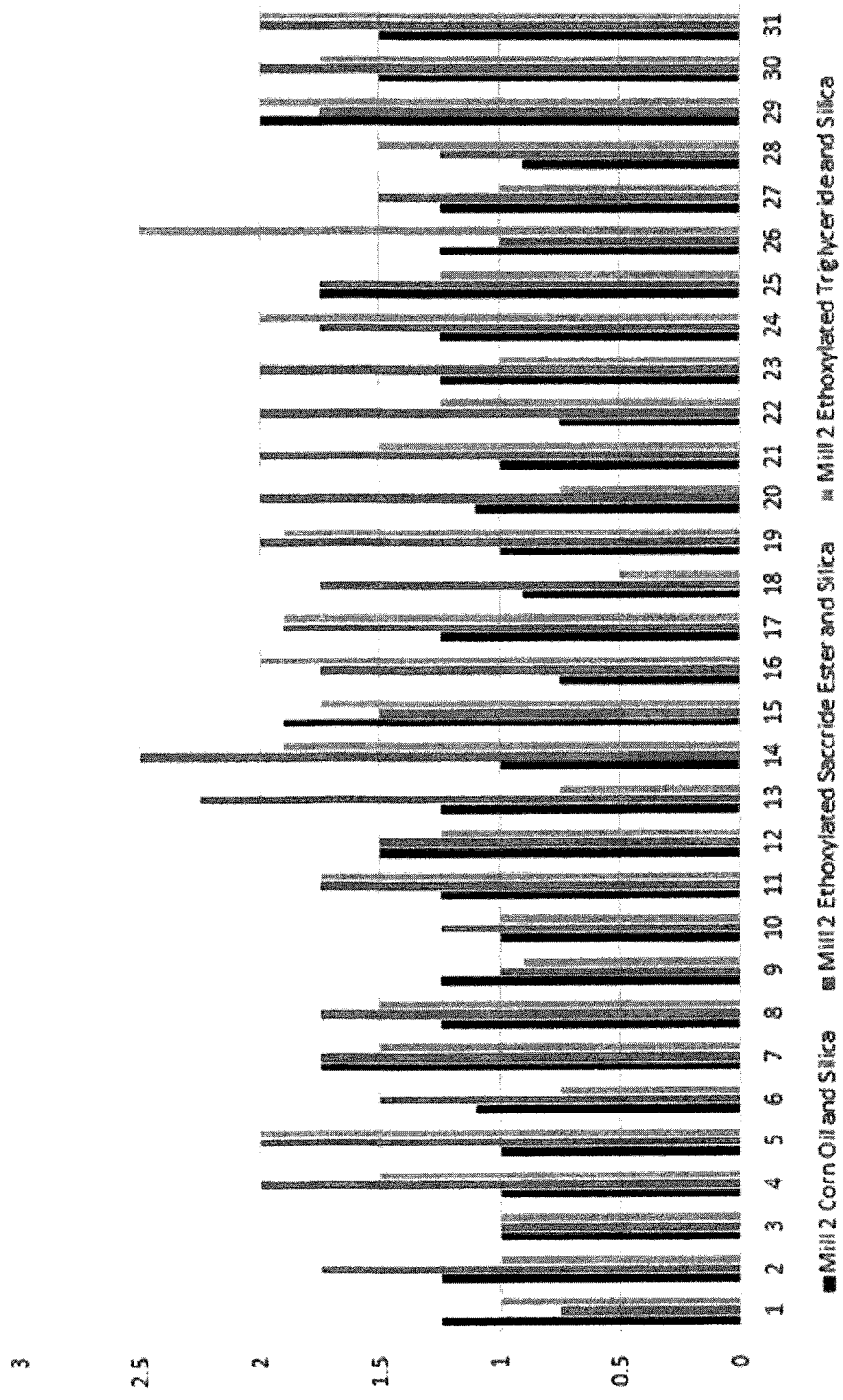
Figure 9:
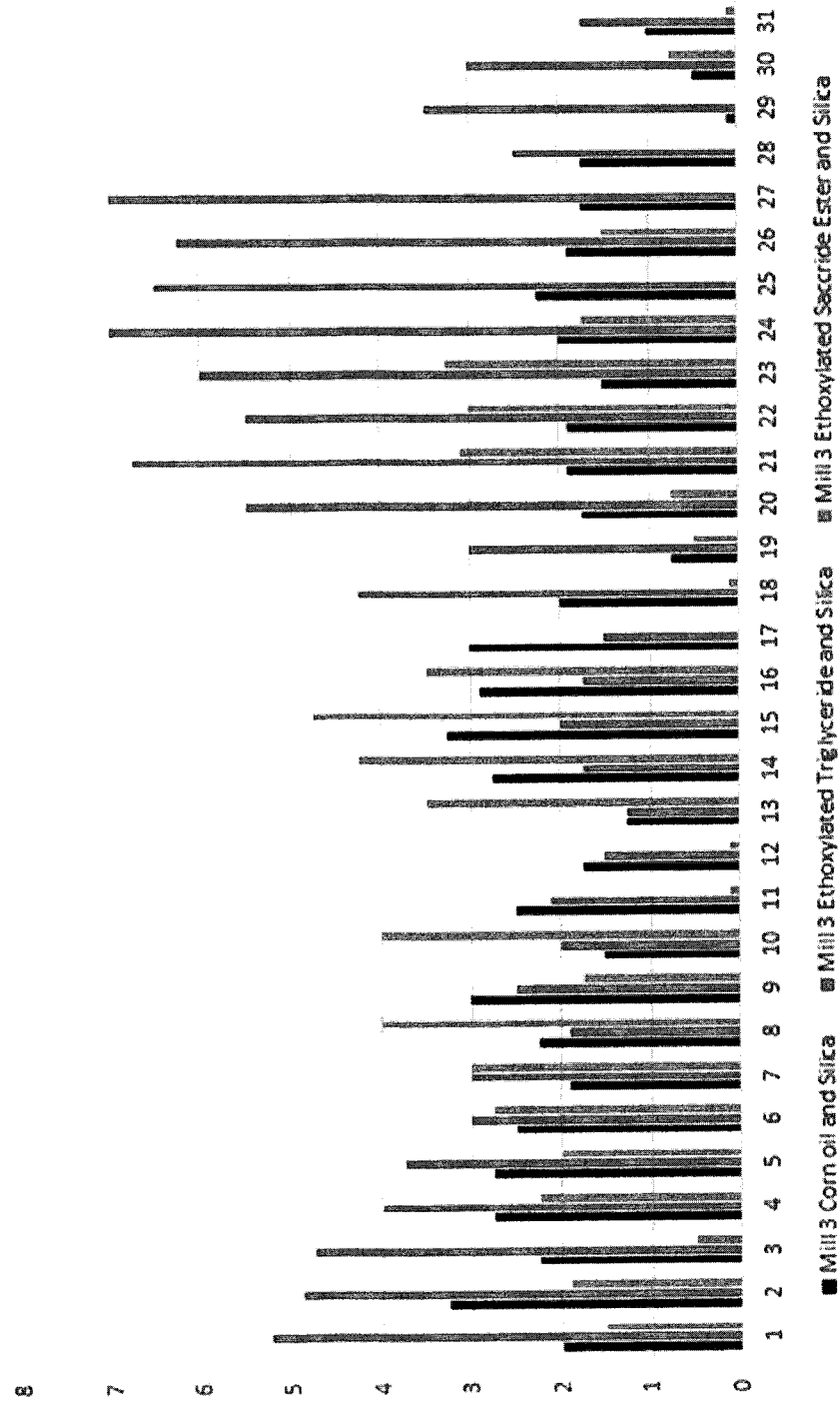
Figure 10:
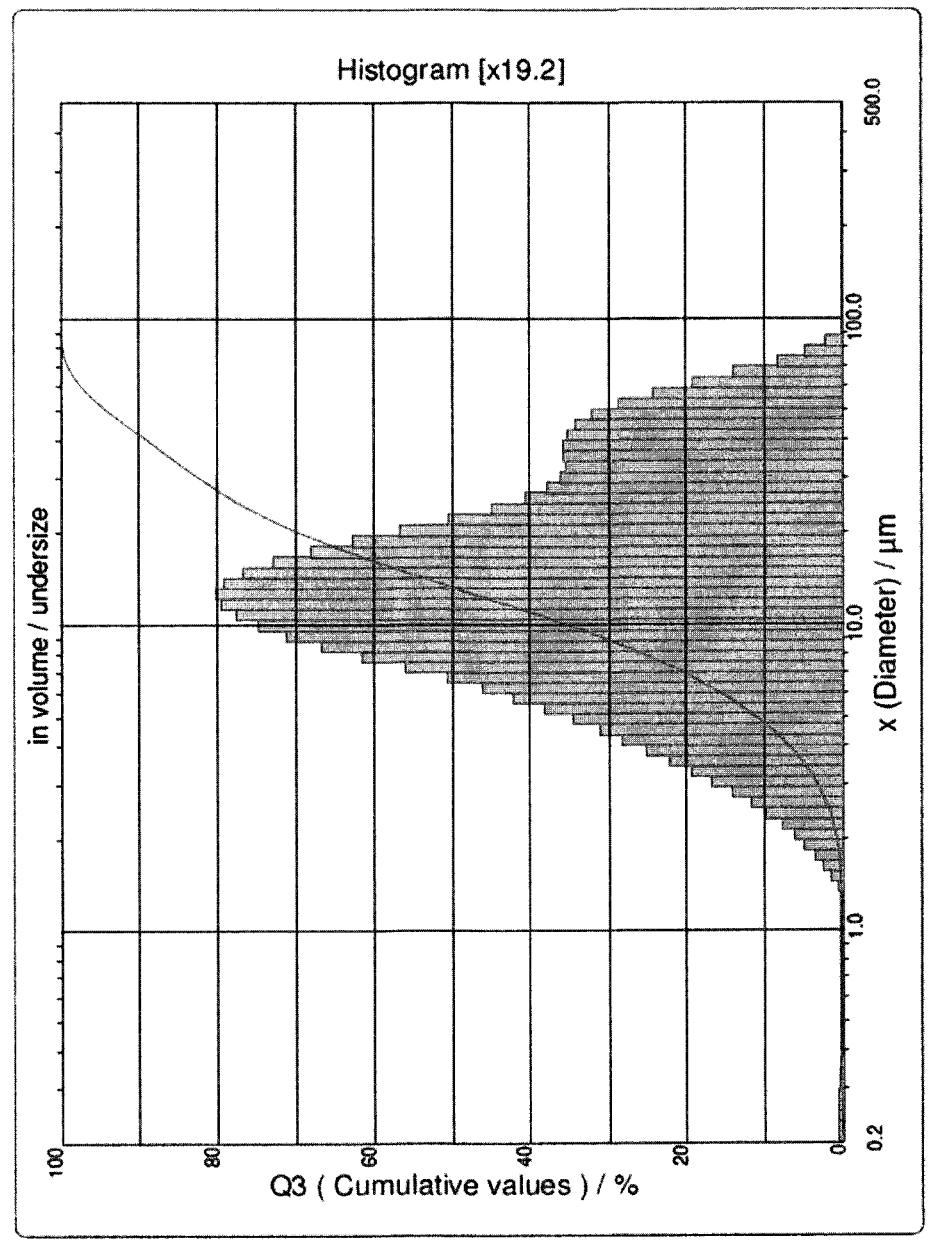
FIGS. 10-13 are charts illustrating the performance of different silica blends.
Figure 11:
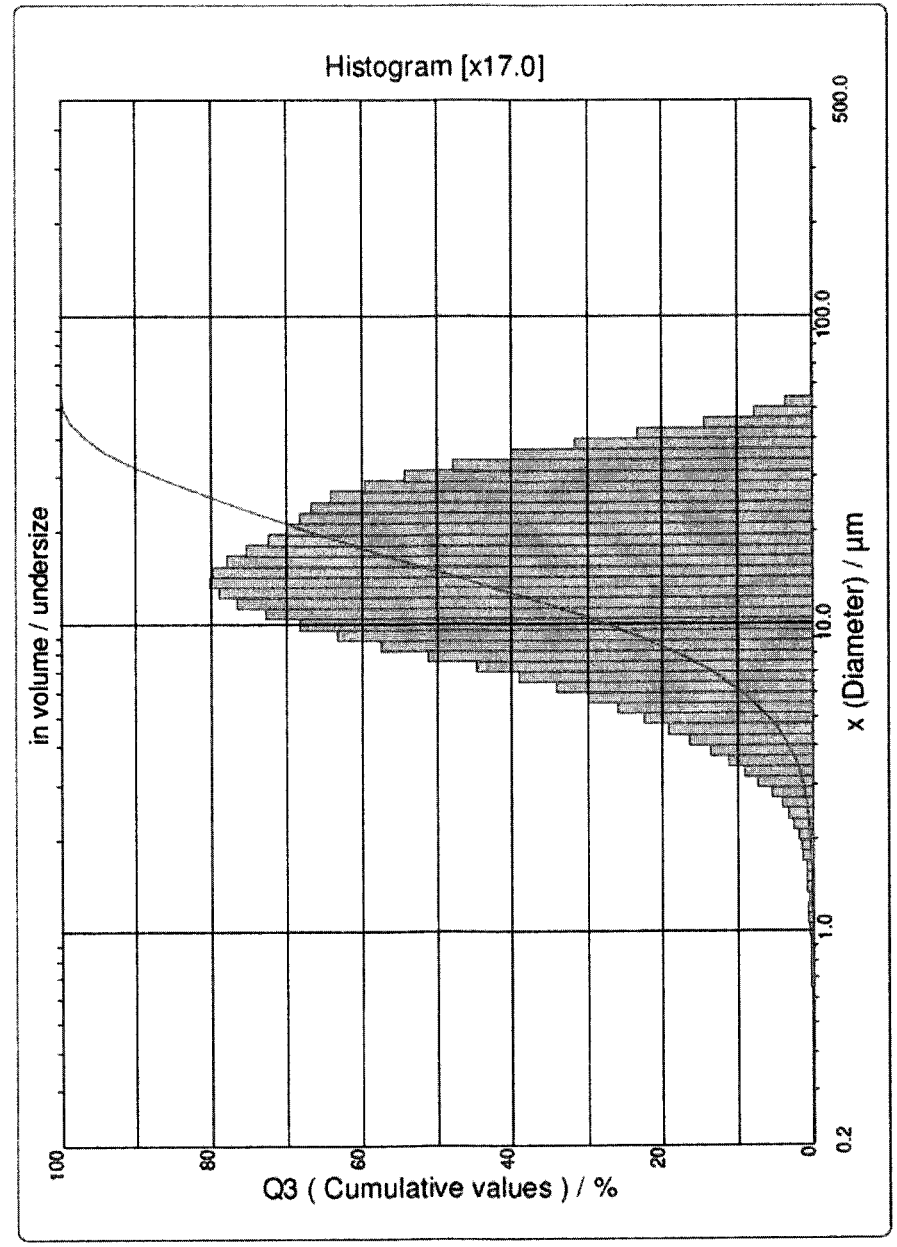
Figure 12:
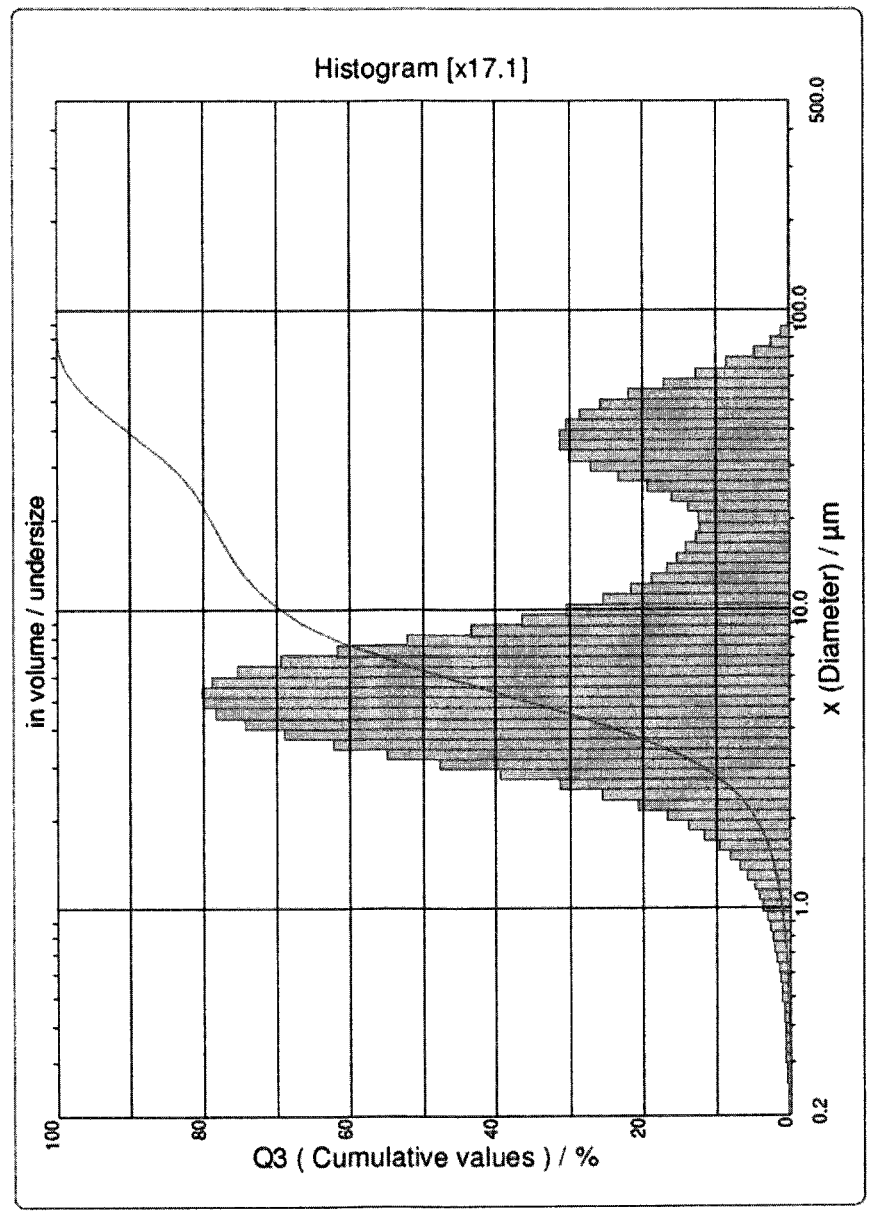
Figure 13:
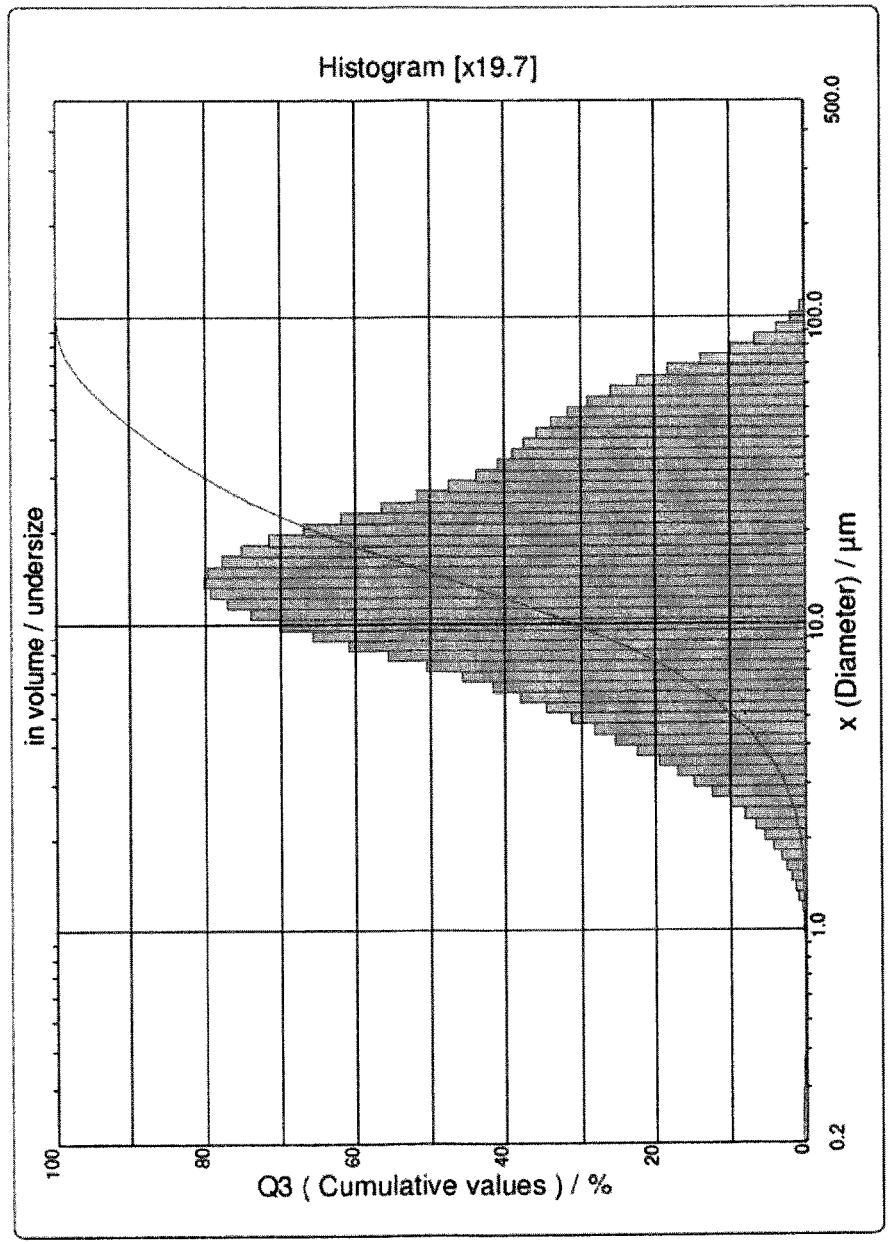

Exemplary additive for reclaiming oil from fluid product stream compositions, methods of making the chemical additive, and applications of such chemical additive will now be described in detail with respect to the detailed description, FIGS. 1-13, and examples that follow. The preferred embodiments described herein are not intended to be exhaustive or to limit the invention to the precise forms disclosed. The section headings provided herein are for convenience only and are not intended to limit the scope of the invention in any way.

As noted above, and also in FIGS. 1 and 2, the formulated additive for reclaiming oil from fluid product stream compositions increases the oil separation rate and efficiency when added in specific amounts and under specific conditions.

It has been known to those skilled in the art that surfactants help with the separation of organic oils/materials and dewatering since before the late 1990's. The use of silicates such as precipitated or fumed silicon dioxide, diatomaceous earth, talc, or volcanic ash, for example, has been shown in some instances to improve the recovery of oils above the use of surfactants alone. There are some cases where hydrophilic silicates perform better than hydrophobic silicates and vice versa. One silicate with certain particle size or agglomerate size may perform better in an application than another. This is true even in the same industries which use similar production methods.

There is typically a large variation from plant to plant, and therefore a broader conceptual approach is necessary to have a product which will work well across a wide range of applications. This invention encompasses silicate compounds with a wide range of particle and agglomerate sizes. The invention also controls the level of hydrophobicity. With both approaches this allows the silicate to work over a wider range of facilities within the same business and in the same application, minimizing the need for a special formula for each facility.

The level of hydrophobization is controlled by the amount or percentage of treating material applied to the silicate and the molecular weight of the material treating the silicate along with the particle size and surface area of the silicate. This differs from mixing hydrophilic and hydrophobic silica in that all of the silica has some degree of hydrophobicity when treated in the manner of the invention versus mixing the hydrophilic and hydrophobic silica. In the photograph labeled as Photo 1 (left side) in FIG. 3, the mixture of hydrophobic and hydrophilic silicas are blended and then put into deionized water (also referred to as "DI Water"). The deionized water wets out the hydrophilic silica, giving a cloudy appearance to the water. The silica treated in the manner of the invention does not wet out in deionized water; thus showing its hydrophobic properties.

When the silica treated in the manner of the invention (Photo 2 in FIG. 3) is put into a 35% methanol and 65% deionized water solution the silica wets out, showing the hydrophilic nature of the silica when compared to a commercially available hydrophobic precipitated silica, such as AMSil™ 35-FGK from Applied Material Solutions, Inc. which does not wet out in the methanol solution.

The controlled hydrophobicity of the silicate and wide span of particle size allows the silicates treated to be used over a wide range of facilities within an application. The hydrophobicity of the silicate, the particle size, and agglomerate size can be adapted to fit new applications.

Tables 1-3, in FIGS. 4-6, show the precipitated silica blends, the percent silicone, and the silicone viscosity used to treat the silica.

Procedure for Preparing the Silica:

The dry roaster used is a proprietary design by Applied Material Solutions, Inc. The dry roaster allows powders to be mixed at a fixed temperature. The temperature range is from ambient to 260° C. The dry roaster can be run with an inert atmosphere, it can allow moisture or other by products, or it can be sealed.

The steps for preparing the silica are as follows:
1. The silica is weighed out in parts per experimental conditions; for sample 1, for example, 1 part Silica 1 is used and then 1 part Silica 2, and next 1 part Silica 3, etc. This is 94% of the formula and the balance is 6% 1,000 cs silicone. The other 30 samples are calculated in a similar manner.
2. The silica is put into a dry roaster, the temperature is set to typically 230° to 260° C., a $N_2$ blanket is applied, the heater is turned on, and the agitator is turned on.
3. The silicone is added while the silica is heating and mixing per experimental conditions.
4. The dry roaster mixes the silica and silicone mixture at 230° to 260° C. for 5 hours.
5. After 5 hours at 230° to 260° C. the heat is turned off and the silica is cooled overnight.

Sample Preparations for Silica Evaluation

During testing of the inventive method, samples were prepared in the following manner.

Treated silica was dispersed into the test mixture using a cowles bade. Three types of additions were used to test the efficacy of the silica. A typical standard level of silica was added to the test mixture. These mixtures were evaluated in thin stillage from three different ethanol factories which derive their ethanol from fermented corn. The samples made were used to extract corn oil from the thin stillage.

Evaluation for the Extraction Testing Procedure

It is important to note that the testing is relative to the other samples and not indicative of actual corn oil recovery in the ethanol process. The goal was to determine which silica performs best when compared to the other silica samples and how they interact with the chosen surfactants.

Dosage level and centrifuge speed were based on the behavior of the stillage used. The same samples were screened at different rpms ranging from 500 rpms to 2,000 rpms. The goal was to have the minimum dosage of the silica mix and minimum rpms necessary to achieve corn oil separation with maximum differentiation between samples.

The standard procedure was to add 50 ml of thin stillage into a centrifuge tube. The filled centrifuge tube was then placed into a hot water bath and the temperature of the thin stillage in the centrifuge tube was raised to 85° C. Once the temperature reached 85° C. the thin stillage in the centrifuge tube was dosed with the demulsifying compound, placed in the centrifuge, and spun in the centrifuge at the determined rpms for 1 minute.

Next, the centrifuge tube was removed and the corn oil separated from the thin stillage was measured in millimeters (mm). The more oil which was extracted, the better the demulsifier performed. During testing, thirty-one samples were evaluated along with a blank (no additives) and a control (no silica in the blend) in thin stillage samples from three different ethanol plants.

All particle size was measured in Volume %. As can be seen in Tables 1-3 in FIGS. 4-6, Silica 1 had an average particle size of 9.0 μm and an agglomerate size of 13.25 μm. The Specific Surface Area or SSA of Silica 1 is 170 $m^2$/g. Silica 2 had an average particle size of 12 μm and an agglomerate size of 17.31 μm. The Specific Surface Area or SSA of Silica 2 is 140 $m^2$/g. Silica 3 had an average particle size of 4.5 μm and an agglomerate size of 13.25 μm. The Specific Surface Area or SSA of Silica 3 is 180 $m^2$/g. The testing results are shown in charts 1 through 7 in FIGS. 7-13.

Histograms and Particle Size Data of Silicas Used in Testing

The particle size was measured using a Cilas 990 and the dispersant liquid used was deionized water with no sonification. The particle size measured was the agglomerate size. The particle size was information obtained from the supplier.

Based on the above results, it became evident that no particular silica treatment or treatment level was effective across all surfactants and/or thin stillage. It was found that the treated silica blends with the wider particle and agglomerate size range and with controlled hydrophobicity were more effective across a wider range of surfactants and thin stillage.

The more hydrophobic blends and those blends with a narrower range proved to be the most effective in one or two tests, but not across a wide range of surfactants or stillages. When the testing was viewed as a whole, the silicas which proved to be effective in a broader spectrum of surfactants and thin stillages were those silica blends with controlled hydrophobicity and a wide particle and agglomerate size range.

The hydrophobicity was controlled through the use of the silicone viscosity. Specifically, the thinner the silicone viscosity or lower molecular weight, the more effective it was in making the silica hydrophobic, and the converse of this statement was also true. For example, this indicated that 100 cs silicone will make a more hydrophobic silica than 1,000 cs silicone, etc.

The research and product testing showed that using a silicate which has been either insufficiently treated or treated with the wrong substrate can result in a hydrophobic silicate yielding less oil separation than a hydrophilic silicate. When the proper amount of the correct substrate is used to treat the silicate to make it hydrophobic and subsequently used in the oil separation compound, superior results are achieved as shown in the inventive method and inventive silica/silicate.

Wide varieties of materials are available for the various parts discussed and illustrated herein. While the principles of this invention and related method have been described in connection with specific embodiments, it should be understood clearly that these descriptions are made only by way of example and are not intended to limit the scope of the application. It is believed that the invention has been described in such detail as to enable those skilled in the art to understand the same and it will be appreciated that variations may be made without departing from the spirit and scope of the invention.

The invention claimed is:

1. A treated silica with a hydrophobicity comprising a silica or silicate with a particle size of between 3.0 μm to 20 μm and a level of hydrophobicity measured by a methanol wet out testing procedure, the silica or silicate having an agglomerate size of between 10 μm to 100 μm and with a level of hydrophobicity measured by the methanol wet out testing, the silica or silicate having a Specific Surface Area of 100 $m^2$/g to 200 $m^2$/g, the treated silica being an additive for reclaiming oil from a fluid product stream.

2. The treated silica of claim 1 wherein the oil is either an internal phase or an external phase of an emulsion process.

3. The treated silica of claim 1 further including a surfactant for oil recovery from a fluid product stream.

\* \* \* \* \*